(12) United States Patent
Yamamoto et al.

(10) Patent No.: US 6,587,161 B1
(45) Date of Patent: Jul. 1, 2003

(54) LIQUID CRYSTAL DISPLAY DEVICE AND METHOD FOR PRODUCING THE SAME

(75) Inventors: Tomohiko Yamamoto, Nara (JP); Keiichi Tanaka, Tenri (JP); Naoto Inoue, Shiki-gun (JP); Kouji Fujiwara, Tenri (JP); Yasunobu Tagusa, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/298,161

(22) Filed: Apr. 23, 1999

(30) Foreign Application Priority Data

Apr. 30, 1998 (JP) .............................. 10-121032

(51) Int. Cl.[7] .............................................. G02F 1/136
(52) U.S. Cl. ............................. 349/43; 257/72; 349/42
(58) Field of Search ............................ 349/40–43, 139; 257/59, 72

(56) References Cited

U.S. PATENT DOCUMENTS

| 4,678,282 A | 7/1987 | Yaniv et al. |
| 4,694,287 A | 9/1987 | Chenevas-Paule et al. |

FOREIGN PATENT DOCUMENTS

| JP | 63124034 A | 5/1988 |
| JP | 02135318 A | 5/1990 |
| JP | 04-294391 | 10/1992 |
| JP | 05-224339 | 3/1993 |
| JP | 181151/1993 | 7/1993 |
| JP | 05-224239 | 9/1993 |
| JP | 128687/1995 | 5/1995 |
| JP | 10-010493 | 1/1998 |

*Primary Examiner*—William L. Sikes
*Assistant Examiner*—Dung Nguyen
(74) *Attorney, Agent, or Firm*—Nixon & Vanderhye P.C.

(57) ABSTRACT

A pixel substrate has a plurality of scanning lines and a plurality of reference signal lines which are arranged parallel with each other. A counter substrate includes a plurality of signal lines. Moreover, the pixel substrate has a connecting line for connecting the plurality of the reference signal lines to each other. The connecting line is provided in each of two regions outside of two sides among the peripheral sides of a region where a plurality of pixel electrodes are formed, the two sides being perpendicular to the reference signal lines. In this structure, a reference signal is input from both ends of the reference signal line. It is therefore possible to provide a liquid crystal display device which reduces the occurrence of a short circuit between the lines on the substrate and decreases the signal delay due to the load capacitance.

10 Claims, 10 Drawing Sheets

LIQUID CRYSTAL DISPLAY DEVICE AND METHOD FOR PRODUCING THE SAME

FIELD OF THE INVENTION

The present invention relates to liquid crystal display devices for use in, for example, monitors for personal computers and OA (office automation) and FA (factory automation) equipment, and display panels for portable information terminals.

BACKGROUND OF THE INVENTION

Conventionally, liquid crystal display devices using nematic liquid crystals have been widely used as segment type liquid crystal display devices for use in watches and electronic calculators. In recent years, such a liquid crystal display device has expanded its market and been used as various types of displays for word processors, personal computers, navigation systems, etc., because of its thin, light weight, low power consuming characteristics. In particular, an active matrix liquid crystal display device in which active elements such as TFTs (thin film transistors) are used as switching elements and pixels are arranged in a matrix, has been noted.

Compared to, for example, a CRT (cathode ray tube), the above-mentioned liquid crystal display devices have advantages that they can be made much thinner (in depth), achieve a full color display easily, and consume less power. Therefore, such liquid crystal display devices are suitably used as displays of notebook type personal computers, portable television sets, digital cameras, digital video cameras, and so on.

A conventional transmissive type active matrix liquid crystal display device includes a light transmitting active matrix substrate, a counter substrate having a common electrode formed thereon, and a liquid crystal. An active matrix circuit constituted by a TFT is formed on the active matrix substrate. The counter substrate is disposed to face the active matrix substrate, and a liquid crystal is sandwiched between the active matrix substrate and the counter substrate.

Figure 11:
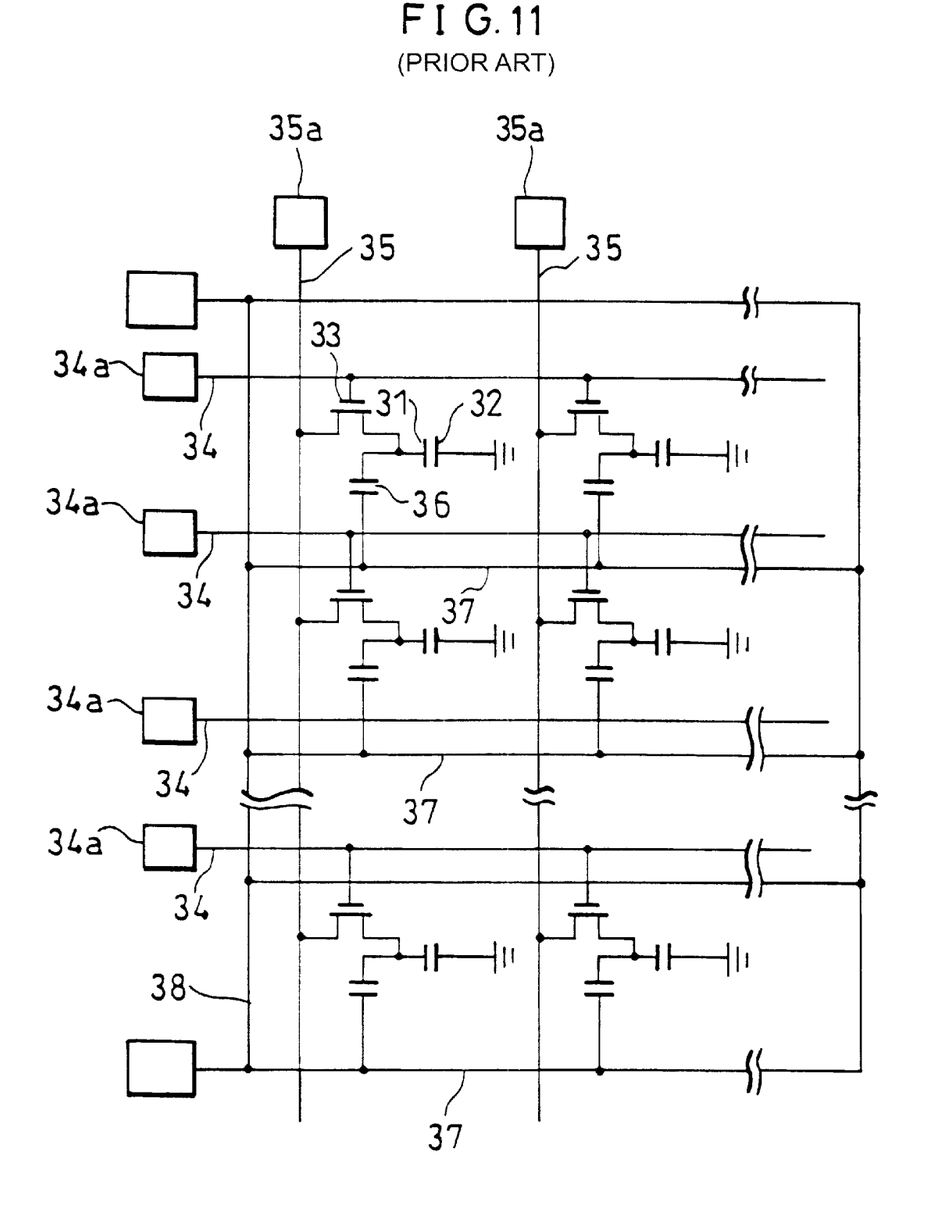
FIG. 11 is a circuit diagram showing a structure of an active matrix circuit on an active matrix substrate of a conventional liquid crystal display device.

FIG. 11 is a circuit diagram showing schematically an example of the active matrix circuit on the active matrix substrate. A plurality of pixel electrodes 31 are arranged in a matrix on the active matrix substrate. Usually, several hundred pixel electrodes 31 are arranged respectively in rows and columns.

Besides, a common electrode 32 is formed on the counter substrate so that the common electrode 32 faces the pixel electrodes 31 with a liquid crystal layer therebetween. A voltage is applied to the liquid crystal layer by the pixel electrodes 31 and common electrode 32. In general, the common electrode 32 is formed on the substantially entire surface of the counter substrate.

Moreover, TFTs 33 as active elements functioning as switching means for selectively driving the pixel electrodes 31 are formed on the active matrix substrate and connected to the pixel electrodes 31. Furthermore, in order to provide a color display, a color filter layer (not shown) including, for example, red, green and blue filters is placed on the counter substrate or the active matrix substrate.

Scanning lines 34 are connected to the gate electrodes of the TFTs 33, while signal lines 35 are connected to the source electrodes thereof. The scanning lines 34 and signal lines 35 are arranged such that they run around the pixel electrodes 31 arranged in a matrix and cross each other at right angles. By inputting gate signals through the scanning lines 34, the TFTs 33 are driven under control. Further, when the TFTs 33 are driven, data signals are input to the pixel electrodes 31 through the signal lines 35. Incidentally, scanning signal input terminals 34a are connected to the end sections of the scanning lines 34, and data signal input terminals 35a are connected to the end sections of the signal lines 35.

Besides, the drain electrodes of the TFTs 33 are connected to the pixel electrodes 31 and the accumulation capacitors 36. The accumulation capacitors 36 are connected to reference signal lines 37, respectively. The accumulation capacitors 36 perform the function of maintaining a voltage applied to the liquid crystal layer.

In the active matrix liquid crystal display device as described above, the liquid crystal layer sandwiched between the active matrix substrate and counter substrate has a thickness of usually between 4.3 and 4.5 $\mu$m on average, and a liquid crystal capacitor is formed by the pixel electrodes 31, common electrodes 32 and liquid crystal layer. Additionally, the accumulation capacitors 36 are connected to the liquid crystal capacitor in parallel.

Figure 7:
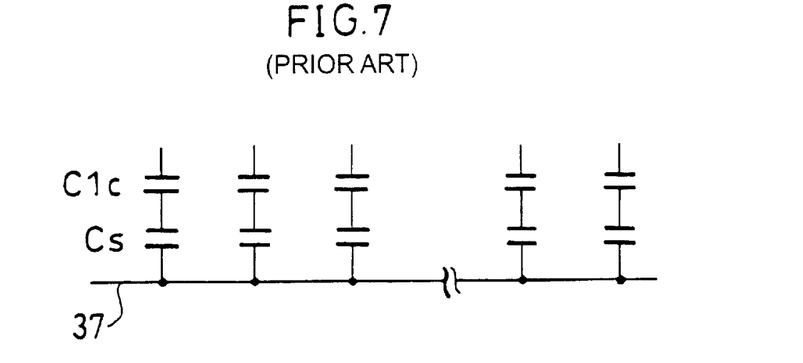
FIG. 7 is a circuit diagram depicting how the reference signal line is connected to liquid crystal capacitors and accumulation capacitors.

In the above-mentioned structure, as illustrated in FIG. 7, the liquid crystal capacitor and the accumulation capacitor 36 are connected to the reference signal line 37 in series. Here, the capacitance of the liquid crystal capacitor is represented by Clc, and the capacitance of the accumulation capacitor 36 is represented by Cs. Then, the series capacitance of the liquid crystal capacitor and the accumulation capacitor 36 per pixel is given by (Clc×Cs)/(Clc+Cs).

For instance, in the case of a liquid crystal display device with a 13.3-inch display and XGA (extended graphics array) of (1024×768), the series capacitance per pixel is around 0.33×Clc. When N pieces of such a series capacitance are provided for each reference signal line 37, the total load capacitance per reference signal line 37 is around 0.33×N× Clc.

Such a load capacitance would cause a signal delay. In order to reduce the signal delay, a connecting line 38 for connecting the reference signal lines 37 to each other may be provided as shown in FIG. 11.

Figure 10:
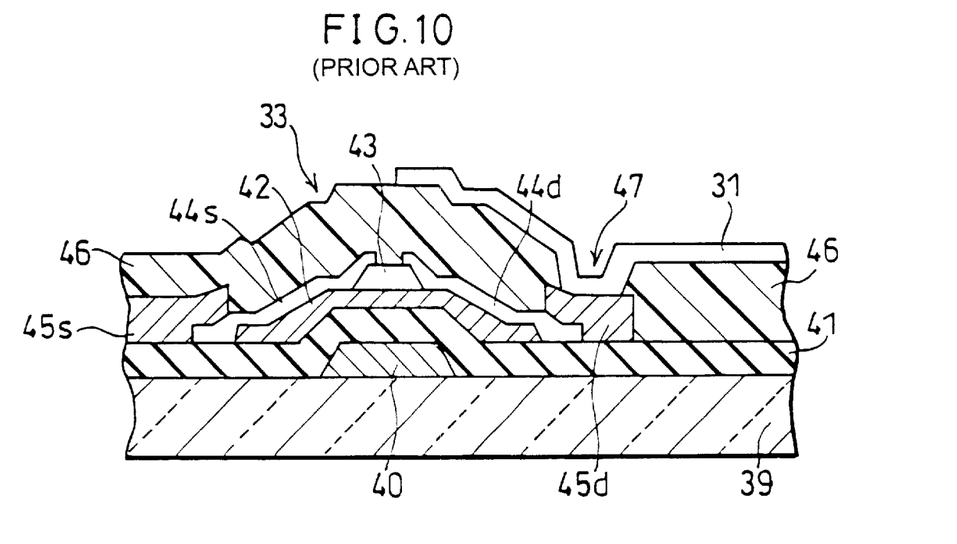
FIG. 10 is a partial cross section showing a structure in the vicinity of a TFT on an active matrix substrate of a conventional liquid crystal display device.

Here, the structure of the TFT 33 will be explained in great detail. FIG. 10 is a cross sectional view showing a schematic structure in the vicinity of the TFT 33. A gate electrode 40 is formed on a transparent insulating substrate 39, and a gate insulating film 41 is formed to cover the gate electrode 40. A semiconducting film 42 is formed on the gate electrode 40 with the gate insulating film 41 therebetween. A channel protecting film 43 is formed at the top center of the semiconducting film 42. A source electrode 44s made of a microcrystal n$^+$ silicone layer is provided on the source side of the channel protecting film 43 and semiconducting film 42. Similarly, a drain electrode 44d made of a microcrystal n$^+$ silicone layer is provided on the drain side thereof.

A metallic layer 45s serving as a source line is connected to the source electrode 44s, while a metallic layer 45d for forming a drain line is connected to the drain electrode 44d.

The surface of the TFT 33 having the abovementioned structure is covered with an inter-layer insulating film 46. Further, a transparent conductive film for forming a pixel electrode 31 is placed on the inter-layer insulating film 46. The pixel electrode 31 is connected to the metallic layer 45d as the drain line of the TFT 33 through a contact hole 47. Moreover, on the pixel electrodes 31, although it is not shown in the drawings, an alignment film for aligning the liquid crystal is formed substantially uniformly over the entire display area.

As the inter-layer insulating film 46, an inorganic thin film such as SiN has been conventionally used. The SiN film is deposited with a film thickness of more than around 300 nm by, for example, a CVD (chemical vapor deposition) method.

Moreover, as an example of a liquid crystal display device having a structure different from the above-mentioned structure of the liquid crystal display device, Japanese laid-open patent publication No. (Tokukaihei) 7-128687 (published on May 19, 1995) discloses a liquid crystal display device in which the signal lines are formed on the counter substrate. In this liquid crystal display device, since the scanning lines and the signal lines are formed on different substrates, they do not intersect each other on a single substrate. As a result, the rate of occurrence of defects due to a short circuit between the scanning line and the signal line is reduced, thereby achieving an improved yield.

Figure 12:
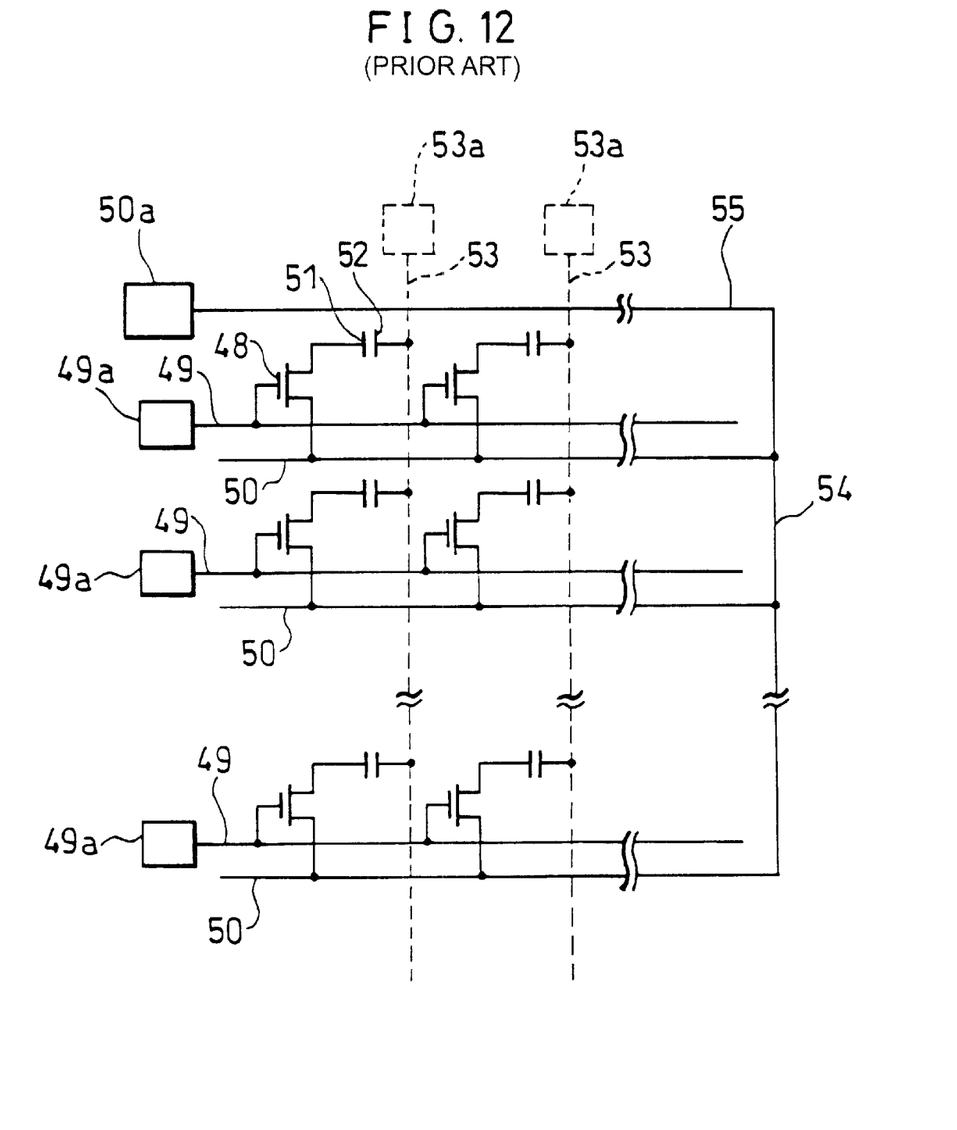
FIG. 12 is a circuit diagram showing a structure of an active matrix circuit on an active matrix substrate of a conventional liquid crystal display device having another structure.

FIG. 12 is a circuit diagram showing schematically an example of a circuit formed on the pixel substrate of the liquid crystal display device including the signal lines formed on the counter substrate. A plurality of three-terminal switching elements 48 made from amorphous silicone semiconductors are arranged in a matrix on the pixel substrate. One terminal of each switching element 48 is connected to a scanning line 49, one of the other terminals is connected to a reference signal line 50, and the remaining terminal is connected to a pixel electrode 51.

Incidentally, counter electrodes 52 and signal lines 53 are formed on the counter substrate.

Each scanning line 49 has a scanning signal input terminal 49a at one of the end sections thereof. Moreover, the reference signal lines 50 are connected to each other with a connecting line 54. Furthermore, a reference signal input terminal 50a is connected through a leading line 55 connected to the connecting line 54.

In order to prevent the connecting line 54 from crossing the scanning lines 49 and reference signal lines 50, the connecting line 54 is arranged on a side opposite to the side whereon the scanning signal input terminals 49a are positioned. Besides, for the purposes of simplifying the packaging, the reference signal input terminal 50a is provided at an end of a line into which the scanning signal input terminals 49a are arranged.

Figure 8:
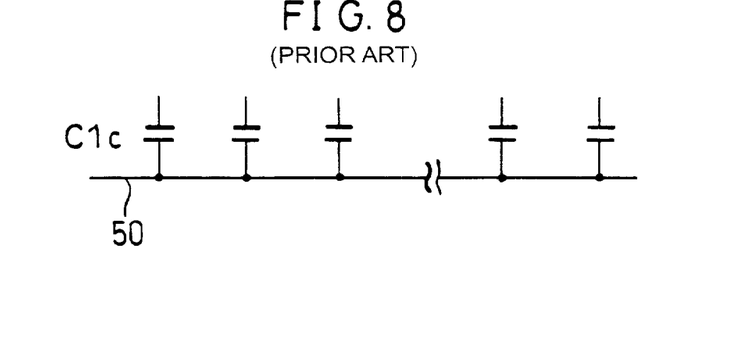
FIG. 8 is a circuit diagram depicting how the reference signal line and liquid crystal capacitors are connected.

In the above-mentioned structure, when the switching element 48 is in an ON state, a liquid crystal capacitor is connected to the reference signal line 50 as shown in FIG. 8. Note that, similarly to the above, the capacitance of the liquid crystal capacitor is denoted as Clc. When N pieces of liquid crystal capacitors are connected to a single reference signal line 50, the load capacitance per reference signal line 50 is around N×Clc. Thus, the load capacitance is larger than that of the above-mentioned liquid crystal display device having the structure shown in FIG. 7.

Figure 9:
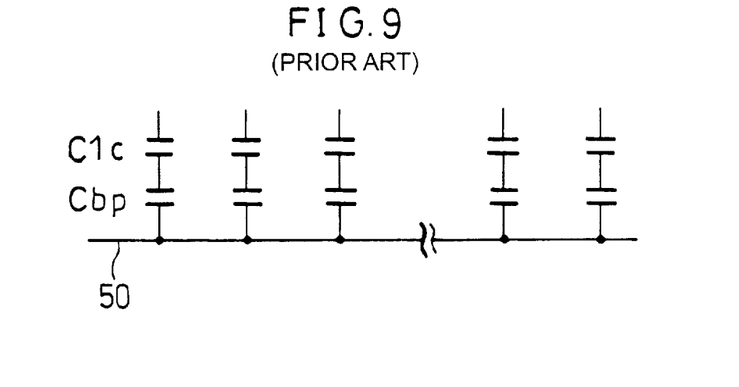
FIG. 9 is a circuit diagram depicting how the reference signal line is connected to liquid crystal capacitors and capacitors between adjacent pixels.

On the other hand, when the switching element 48 is in an OFF state, the liquid crystal capacitor and a capacitor between adjacent pixels are connected in series to the reference signal line 50 as shown in FIG. 9. The capacitor between adjacent pixels means a capacitance between adjacent pixels in the proximity of the reference signal line 50, and the value of the capacitance is denoted as Cbp. In this case, the series capacitance of the liquid crystal capacitance and the capacitance between adjacent pixels per pixel is given by (Clc×Cbp)/(Clc +Cbp).

For instance, for a liquid crystal display device with a 13.3-inch display and XGA (1024×768), the series capacitance per pixel is around 0.03×Clc. Besides, when N pieces of such series capacitors are connected to a single reference signal line 50, the total load capacitance with respect to the single reference signal line would be around 0.03×N×Clc.

In a liquid crystal display device having the structure shown in FIG. 11, when the inter-layer insulating film 46 is formed by depositing a transparent insulating film such as $SiN_x$, $SiO_2$, and $TaO_x$, by the CVD method or sputtering method, the irregularity on the surface of the metallic film as the under layer reflects on the inter-layer insulating film 46 as shown in FIG. 10.

In addition, since the scanning lines 34 and signal lines 35 are arranged to intersect each other on the insulating substrate 39, an extremely large number of intersections of the scanning lines 34 and signal lines 35 are present on the insulating substrate 39.

Therefore, at the large number of intersections of the scanning lines 34 and signal lines 35, the signal lines 35 are placed on the scanning lines 34, so that a difference in level is produced. Thus, in such an intersection, the inter-layer insulating film 46 tends to be cracked, and the signal line 35 above the interlayer insulating film 46 tends to be cut during the production. Alternatively, in the event where a pinhole-like defect is present in the inter-layer insulating film 46, a short-circuit occurs between the signal line 35 as the upper layer and the scanning line 34 as the lower layer, resulting in a lowered yield.

Moreover, there are possibilities that a new crack is produced at such an intersection with the passage of time and the crack produced during the production becomes larger, due to the influence of a film deposition residual force and so on. Thus, there is a possibility that defects occur in the products after putting the products on the market, resulting in a lowering of the reliability.

Furthermore, in order to decrease the signal delay, for example, it is preferred to arrange the line width of the reference signal line 37 to be wider than the line width of the scanning line 34. However, if the line width of the reference signal line 37 is increased too much, the aperture ratio of the liquid crystal display device is lowered and the brightness is lowered. The reason for such a lowering is that the reference signal line 37 is formed by a light blocking metallic material with low resistivity as so to achieve a low resistance.

Alternatively, the signal delay cay be decreased by providing the connecting line 38 as described above. However, since the load capacitance with respect to the reference signal line 37 is substantially uniform at a relatively high value irrespective of whether the TFT 33 is in an ON state or an OFF state. Thus, the provision of the connecting line 38 is insufficient to produce the effect of decreasing the signal delay.

In contrast, in a liquid crystal display device having the structure shown in FIG. 12, since the signal lines 53 are formed on the counter substrate, defects such as a short-circuit between the signal lines 53 and the scanning lines 49 do not occur. However, none of Japanese laid-open patent publication No. (Tokukaihei) 7-128687 (published on May 19, 1995) and other prior art documents disclose anything about the change in the load capacitance of the reference signal line 50 according to the ON or OFF state of the switching element 48 and the structure of arranging the connecting line 54 in light of the change in the load capacitance.

SUMMARY OF THE INVENTION

Objects of the present invention are to provide a liquid crystal display device capable of reducing the occurrence of a short circuit between lines on a substrate and decreasing the signal delay due to a load capacitance, and a method for producing a liquid crystal display device at an excellent yield.

In order to achieve the above object, a liquid crystal display device of the present invention includes:

a pixel substrate having a plurality of pixel electrodes arranged in a matrix, a plurality of reference signal lines connected to the pixel electrodes through switching elements, and a plurality of scanning lines, each of the scanning lines having a scanning signal input terminal at one of ends thereof, each of the switching elements being switched according to a scanning signal input through the scanning signal input terminal;

a counter substrate disposed to face the pixel substrate, the counter substrate being provided with a plurality of counter electrodes arranged to face the pixel electrodes and a plurality of data signal lines that intersect the scanning lines with a liquid crystal layer therebetween;

a first connecting line for connecting the reference signal lines to each other, the first connecting line being located outside of a region where the pixel electrodes are arranged and in proximity of the other end of each of the scanning lines; and at least one second connecting line for connecting the reference signal lines to each other, the second connecting line being located outside of the region where the pixel electrodes are arranged and in proximity of the scanning signal input terminals.

According to this structure, the pixel substrate faces the counter substrate with the liquid crystal layer therebetween, the pixel electrodes, scanning lines and switching elements are formed on a substrate different from a substrate having the data signal lines formed thereon, and the scanning lines and data signal lines cross each other with the liquid crystal layer therebetween.

The switching element is switched according to a scanning signal applied to the scanning line through the scanning signal input terminal. As a result, a reference signal is supplied to the pixel electrode, while a data signal is supplied to the counter electrode through the data signal line. Thus, by supplying the reference signals and data signals to the pixel electrodes and the counter electrodes, respectively, a liquid crystal display according to the data signals is provided.

By the way, in the case where only a single connecting line for connecting the reference signal lines to each other is provided (where the reference signals are supplied through only a single line), the load capacitance of the reference signal line varies according to a switching state (ON or OFF) of the switching element, and therefore the reference signal is delayed due to the charging of the load capacitance.

Hence, in the above-mentioned structure, the first connecting line arranged in the proximity of the other end of each scanning line and the second connecting line arranged in the proximity of each scanning signal input terminal are positioned outside of the region where the pixel electrodes are formed. The first and second connecting lines are positioned on the opposite sides with respect to the region where the pixel electrodes are formed. Therefore, the reference signal is supplied to each reference signal line through both connecting lines (first and second connecting lines).

In this case, the signal delay becomes maximum in the vicinity of the center of each reference signal line. In the case where only a single reference signal line is provided, the signal delay becomes maximum at an end of each reference signal line located on the opposite side to the reference signal input side. Thus, when the reference signal is supplied through the first and second connecting lines, the resistance and electrostatic capacitance from the input terminals (first and second connecting lines) of the reference signal are reduced to about ½ of those when the reference signal is supplied through only a single connecting line. Consequently, the signal delay due to the charging of the load capacitance of the reference signal line is decreased to about ¼.

The load capacitance of the reference signal line is much larger when the corresponding switching element is switched ON than when the switching element is switched OFF. However, according to the abovementioned structure, switching elements in the OFF state are connected to reference signal lines located on each side of a reference signal line connected to a switching element in the ON state, and these three reference signal lines are connected to each other with the first and second connecting lines. Hence, the load capacitance of the reference signal line connected to the switching element in the ON state is decreased on the whole, and the signal delay due to the load capacitance can be certainly reduced by an amount corresponding to the decrease in the load capacitance.

For a fuller understanding of the nature and advantages of the invention, reference should be made to the ensuing detailed description taken in conjunction with the accompanying drawings.

DESCRIPTION OF THE PREFERRED EMBODIMENTS

Embodiment 1

Figure 1:
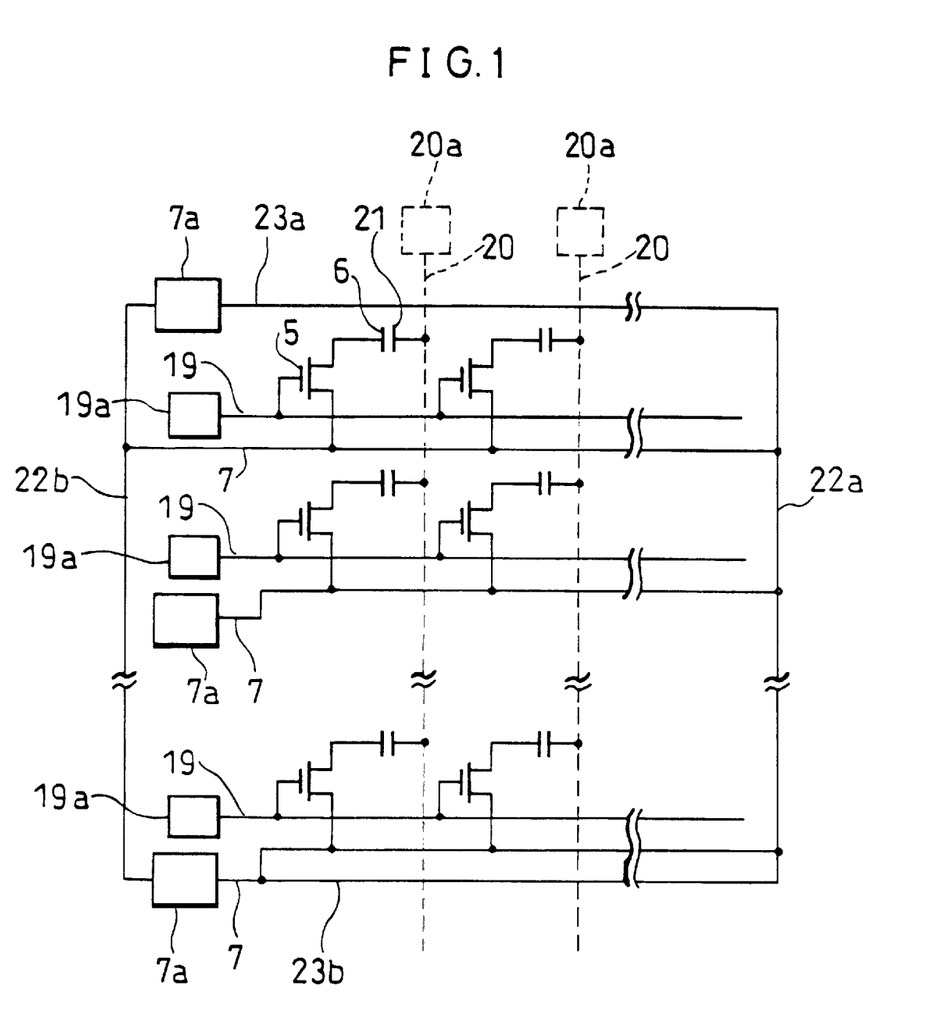
FIG. 1 is a circuit diagram showing a schematic structure of a circuit of a pixel substrate in a liquid crystal display device according to one embodiment of the present invention.
Figure 2:
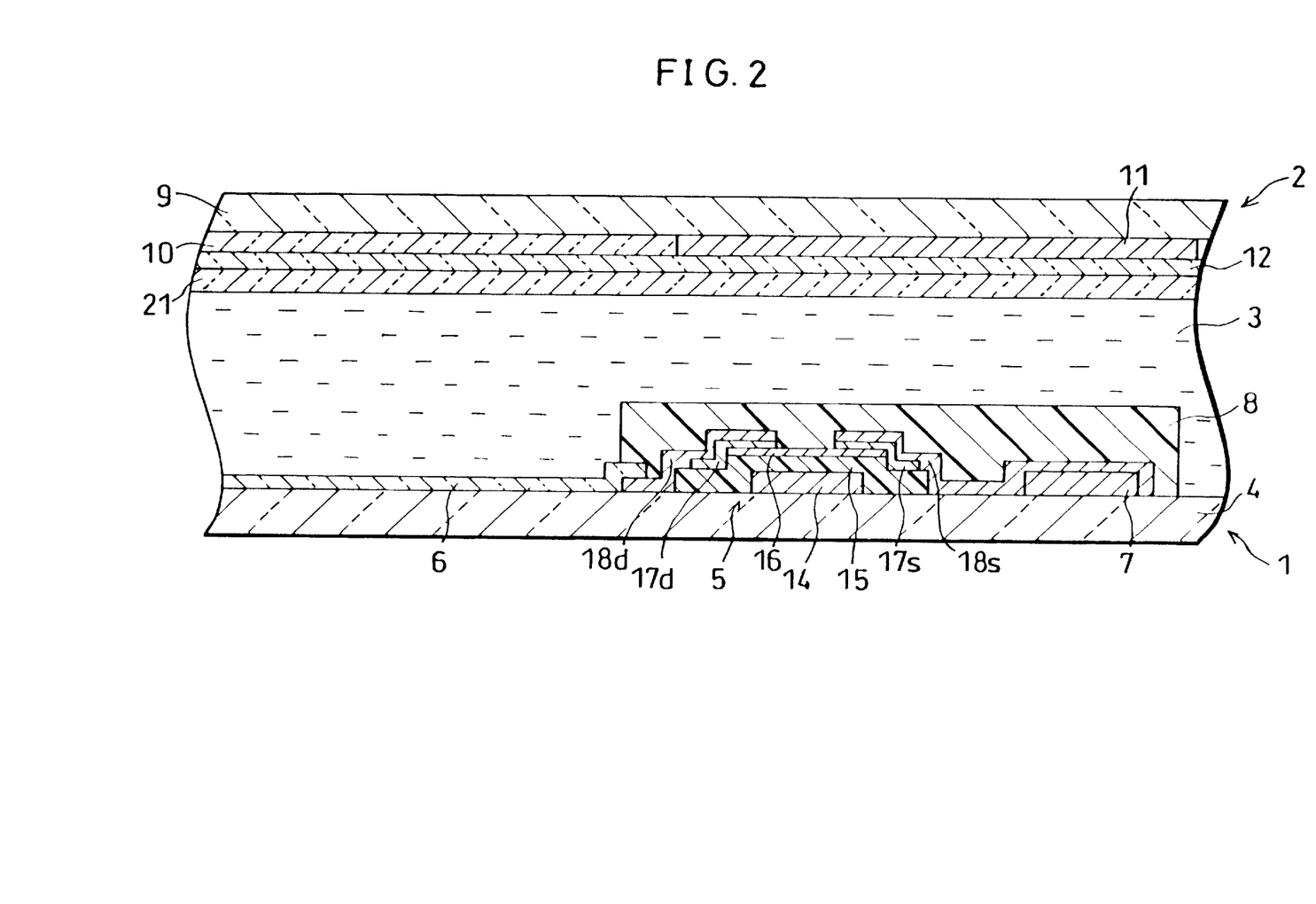
FIG. 2 is a partial cross section showing a schematic structure of the liquid crystal display device.

The following description will explain one embodiment of the present invention with reference to FIGS. 1 and 2.

FIG. 2 is a partial cross section showing a schematic structure of a liquid crystal display device according to this embodiment. The liquid crystal display device includes a pixel substrate 1, a counter substrate 2 disposed to face the pixel substrate 1 with a predetermined space therebetween, and a liquid crystal layer 3 placed in the space between the pixel substrate 1 and the counter substrate 2.

The pixel substrate 1 includes an insulating transparent substrate 4, switching elements 5, pixel electrodes 6, reference signal lines 7 and an interlayer insulating film 8. The switching elements 5, pixel electrodes 6, reference signal lines 7 and an inter-layer insulating film 8 are formed on a surface of the insulating transparent substrate 4, which surface facing the counter substrate 2.

The counter substrate 2 includes an insulating transparent substrate 9, and a color filter layer 10 and a black matrix layer 11 formed on a surface of the insulating transparent substrate 9, which surface facing the pixel substrate 1. Further, an overcoat layer 12 as a flattening film is formed on surfaces of the color filter layer 10 and black matrix layer 11, which surfaces facing the pixel substrate 1. In addition, a counter electrode 21 is formed on a surface of the overcoat layer 12, which surface facing the pixel substrate 1. An end section of the counter electrode 21 is connected to a later-described signal line 20.

Here, the structure of the switching element 5 will be explained in great detail below. A gate electrode 14 is formed on the insulating transparent substrate 4, and a gate insulating film 15 is formed to cover the gate electrode 14. The gate electrode 14 is connected to a later-described scanning line 19. A semiconductor film 16 is formed above the gate electrode 14 with the gate insulating film 15 therebetween. A source electrode 17s made of a microcrystal $n^+$ silicone layer is formed on the source section side of the semiconductor film 16. Similarly, a drain electrode 17d made of a microcrystal $n^+$ silicone layer is formed on the drain section side.

A source line 18s is connected to the source electrode 17s and the reference signal line 7. Meanwhile, a drain line 18d is connected to the drain electrode 17d and the pixel electrode 6.

The surface of the switching element 5 having the above-mentioned structure is covered with the inter-layer insulating film 8. Although it is not shown in any drawings, an alignment film for aligning the liquid crystal is formed on the pixel electrodes 6 substantially uniformly over the entire surface of the display area.

As the inter-layer insulating film 8, an inorganic thin film such as SiN has been conventionally used. The SiN film is deposited with a film thickness of more than around 300 nm by, for example, the CVD (chemical vapor deposition) method.

Referring now to FIG. 1, the following description will explain a circuit provided for the pixel substrate 1 of the liquid crystal display device. A plurality of three-terminal switching elements 5 are arranged in a matrix on the pixel substrate 1 (specifically, on the insulating transparent substrate 4 of the pixel substrate 1). One terminal of each switching element 5 is connected to the scanning line 19, one of the other terminals of each switching element 5 is connected to the reference signal line 7, and the other terminal of each switching element 5 is connected to the pixel electrode 6.

The counter electrodes 21 and signal lines 20 are formed on the counter substrate 2 (specifically, on the counter substrate 2). A data signal input terminal 20a is connected to each signal line 20.

Each scanning line 19 has a scanning signal input terminal 19a at one end thereof. Meanwhile, the reference signal lines 7 are connected to each other with a first connecting line 22a provided outside of an image display area where the pixel electrodes 6 are formed. Furthermore, each reference signal line 7 is connected to a reference signal input terminal 7a through a leading line 23a or 23b connected to the first connecting line 22a.

In actual, several hundred or more scanning signal input terminals 19a are provided, and a plurality of driving circuits (not shown) are packaged by, for example, so-called COG (chip on glass) method or TAB (tape automated bonding) method. The COG method is a packaging method in which a bare chip of a driver LSI is mounted directly on a liquid crystal panel. Meanwhile, the TAB method is a method for packaging a TCP (tape carrier package) type driver.

It is preferred to reduce the cost and package area by forming signal supply lines and connecting terminals (reference signal input circuits) with respect to the reference signal input terminals 7a on a substrate for supplying signals to the above-mentioned COG chip or a TAB film at the same time signal supply lines and connecting terminals (scanning signal input circuits) with respect to the scanning signal input terminals 19a are formed. Namely, by providing one or more reference signal input terminals 7a on one or both sides of a group of the scanning signal input terminals 19a corresponding to one driving circuit, the substrate for supplying signals to the COG chip or the wiring of the TAB film can be shared and simplified.

In order to prevent the first connecting line 22a from crossing the scanning lines 19 and reference signal lines 7, the first connecting line 22a is arranged on a side of the pixel 1 opposite to a side whereon the scanning signal input terminals 19a are arranged. Besides, for the purposes of simplifying the packaging, the reference signal input terminals 7a are provided at the ends of a line into which the scanning signal input terminals 19a are arranged.

Moreover, a second connecting line 22b is provided on the surface of the pixel substrate 1, in a region outside of a line into which the scanning signal input terminals 19a and reference signal input terminals 7a are arranged, so that the reference signal lines 7 and the reference signal input terminals 7a are connected to each other.

The above-mentioned wiring is designed to improve the yield and quality by minimizing the crossing of the respective lines on the pixel substrate 1. Incidentally, in order to prevent a short circuit between adjacent terminals and lines, it is preferred to cover the first and second connecting lines 22a, 22b and the vicinity thereof with, for example, a silicone nitride insulating film and achieve high density packaging.

Moreover, in order to lower the wiring resistance, for example, it is preferred that the width of each of the first and second connecting lines 22a, 22b and leading lines 23a, 23b is wider than the width of each of the scanning lines 19 and reference signal lines 7. Furthermore, since the first and second connecting lines 22a, 22b and leading lines 23a, 23b are arranged outside of the image display area of the pixel substrate 1, the increase in the their width does not affect the aperture ratio and brightness.

Thus, reference signal is input from both ends of each reference signal line 7 through the first and second connecting lines 22a, 22b. Consequently, the signal delay due to the charging of the load capacitor connected to the reference signal line 7 can be reduced to about ¼ of the signal delay in a structure where the reference signal is input from one end of each reference signal line 7.

Next, the following descriptions will explain the signal delay in great detail. When the reference signal is input from one end of each reference signal line 7, the signal delay becomes maximum at an end opposite to the input end. On the other hand, when the reference signal is input from both ends of each reference signal line 7, the signal delay becomes maximum at the center section of each reference signal line 7. Note that both of the resistance and capacitance from the input end, at the center section where the signal delay is maximum when the reference signal is input from both ends of each reference signal line 7, are about ½ of those at the end section where the signal delay is maximum when the reference signal is input from one end. In general, in an equivalent circuit formed by a resistor R and a capacitor C, a product RC of the resistor R and capacitor C is called a time constant, and the signal delay is expressed by the time constant. Therefore, the time constant RC when the reference signal is input from both ends of each reference signal line 7 is about ¼ of the time constant when the reference signal is input from one of the ends of each reference signal line 7.

In the above-mentioned structure, when the switching element 5 is in an ON state, the liquid crystal capacitor is connected to the reference signal line 7. When N pieces of liquid crystal capacitors are connected to a single reference signal line 7, the load capacitance per reference signal line 7 is around N×Clc.

On the other hand, when the switching element 5 is in an OFF state, the liquid crystal capacitor and a capacitor between adjacent pixels are connected in series to the reference signal line 7. The capacitor between adjacent pixels means a capacitance between adjacent pixels in the proximity of the reference signal line 7, and the value of the capacitance is denoted as Cbp. In this case, the series capacitance of the liquid crystal capacitance and the capacitance between adjacent pixels per pixel is given by (Clc×Cbp)/(Clc+Cbp).

For instance, for a liquid crystal display device with 13.3-inch display and XGA (1024×768), the series capacitance per pixel is around 0.03×Clc. Besides, when N pieces of such series capacitors are connected to a single reference signal line 7, the total load capacitance per reference signal line 7 would be around 0.03×N×Clc.

Thus, when the switching element 5 is in an ON state, the load capacitance with respect to the reference signal line 7 is about 30 times greater than the load capacitance when the switching element 5 is in an OFF state. In the above-mentioned structure, since the reference signal line 7 connected to a switching element 5 in the ON state is connected to adjacent switching elements 5 which are located on each side of the switching element 5 in the ON state and are in an OFF state, the total load of the liquid crystal panel can be decreased. It is thus possible to significantly reduce the signal delay.

Furthermore, it is described in above that the signal lines 20 are formed on the counter substrate 2. More specifically, a hundred or more signal lines 20 are formed in a direction perpendicular to the wiring direction of the scanning lines 19 on the pixel substrate 1. The width of each signal line 20 and the width of each counter electrode 21 may be the same or different from each other. The material of the signal lines 20 and the material of the counter electrodes 21 may be the same or different from each other. For instance, it is possible to form the signal lines 20 from a light-blocking low-resistance metallic material and use the signal lines 20 as a light blocking film for preventing light from striking between pixels. Meanwhile, the counter electrodes 21 may be formed from a light transmitting material, for example, ITO (indium tin oxide). Besides, when a single material is provided to serve both as the signal lines 20 and counter electrodes 21, it is possible to reduce the number of the production steps and lower the cost.

Figure 13:
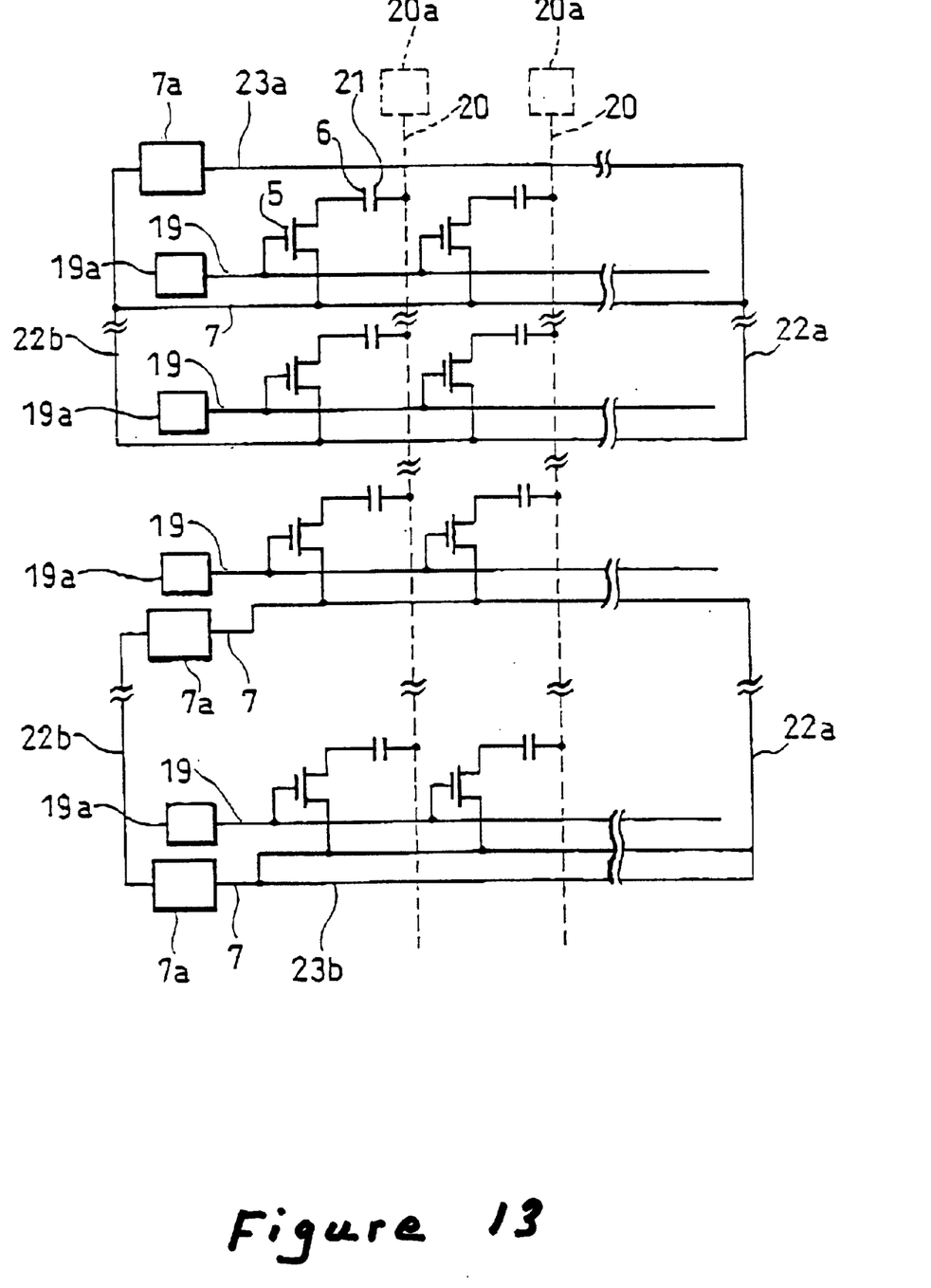
FIG. 13 is a circuit diagram depicting the reference signal lines being divided into groups, with first and second connecting lines being provided for each of the groups.

In the above-mentioned structure, all of the reference signal lines 7 are connected to each other with the first and second connecting lines 22a, 22b. However, it is possible to divide the reference signal lines 7 into some groups according to the reference signal input terminals 7a, and provide the first and second connecting lines 22a, 22b for each group. In this structure, the reference electric potential can be varied according to each group. It is thus possible to adjust the reference signal according to each group, and improve the display quality of the liquid crystal panel.

Embodiment 2

Figure 3:
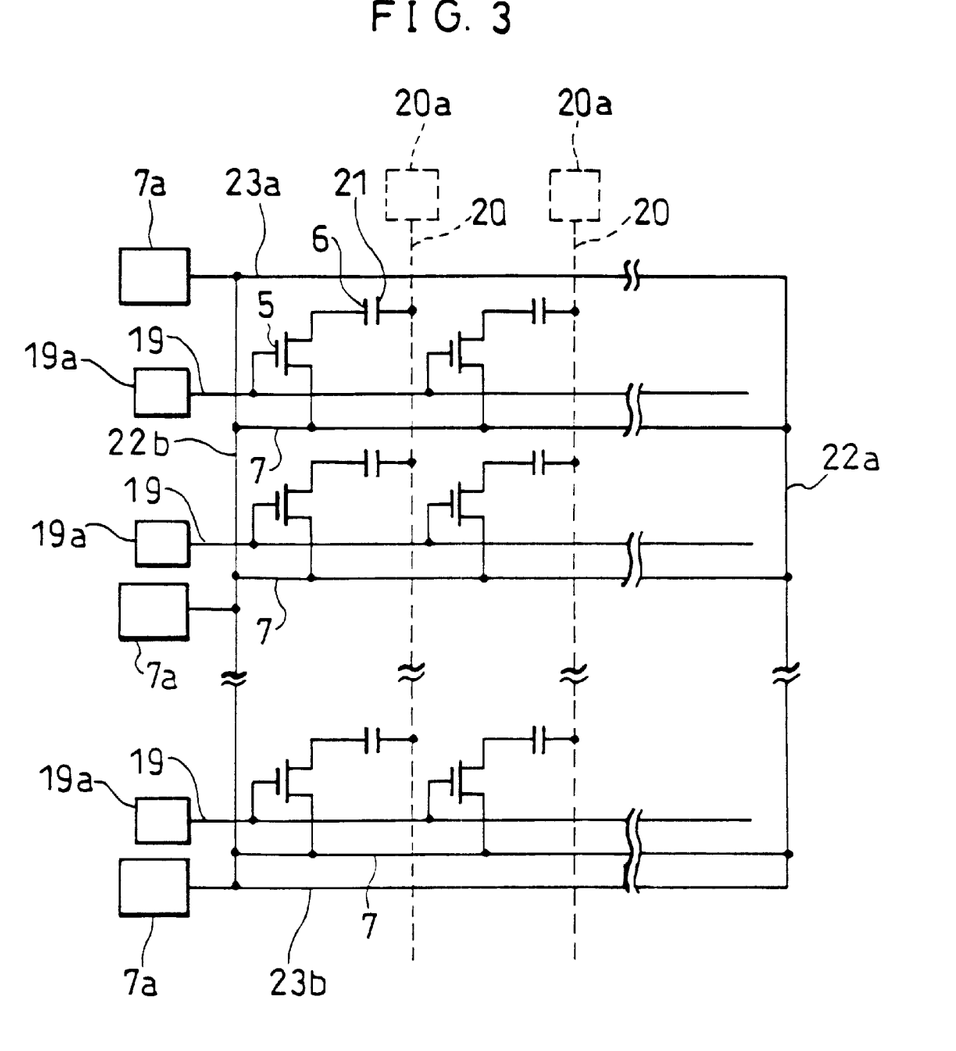
FIG. 3 is a circuit diagram showing a schematic structure of a circuit of a pixel substrate in a liquid crystal display device according to another embodiment of the present invention.

The following description will explain another embodiment of the present invention with reference to FIG. 3. The structures having the same functions as those in the first embodiment will be designated by the same codes and the explanation thereof will be omitted.

A liquid crystal display device according to this embodiment has the same structures as those explained in the first embodiment with reference to FIG. 2, but is different from the liquid crystal display device of the first embodiment in the structure of the circuit formed on the pixel substrate 1.

FIG. 3 is a circuit diagram showing a schematic structure of the circuit on the pixel substrate 1 of this liquid crystal display device. In this embodiment, the second connecting line 22b is arranged between the image display area where the pixel electrodes 6 are formed and a region including a line into which the scanning signal input terminals 19a and reference signal input terminals 7a are arranged. Except for this structure, the structures of the second embodiment are substantially the same as the structures of the first embodiment.

According to the structures of the first embodiment, the second connecting line 22b is located outside of the line of the scanning signal input terminals 19a and reference signal input terminals 7a. In contrast, in the second embodiment, since the second connecting line 22b is arranged in the above-mentioned position, it is possible to reduce the size of the pixel substrate 1, thereby reducing the size of the liquid crystal display.

Hence, the above-mentioned structure produces the effect of reducing the size of the pixel substrate 1. However, according to this structure, since the second connecting line 22b intersects the scanning lines 19 a number of times equal to the number of the scanning lines 19, there is a possibility that a short circuit between the second connecting line 22b and the scanning lines 19 occurs in such intersections.

However, for instance, in the structure shown in FIG. 11 which is explained in the BACKGROUND OF THE INVENTION section, the number of the intersections of the connecting line 38 and scanning lines 34 and the intersections of the scanning lines 34 and signal lines 35 is several ten thousand to several hundred thousand or more. Therefore the number of the intersections in the structure of the second embodiment is much smaller than that in the structure shown in FIG. 11.

In actual, in a liquid crystal display device having the structure shown in FIG. 11, the rate of occurrence of a short circuit and a disconnection of lines was around 5% though there was a slight variation in the rate depending on the type of the liquid crystal display device and the time of production. In contrast, when around 1000 prototype liquid crystal display devices according to the second embodiment were produced, the rate of occurrence of a short circuit and a disconnection of lines at the intersections was 0%.

Assuming that a short circuit occurs at the intersections of the second connecting line 22b and the scanning lines 19 in the structure of this embodiment, even when the short circuit is fixed by cutting the short-circuited section, the display quality can hardly be affected by the cutting in some cases, i.e., depending on the type of the liquid crystal display device and the location of the short circuit.

Embodiment 3

Figure 4:
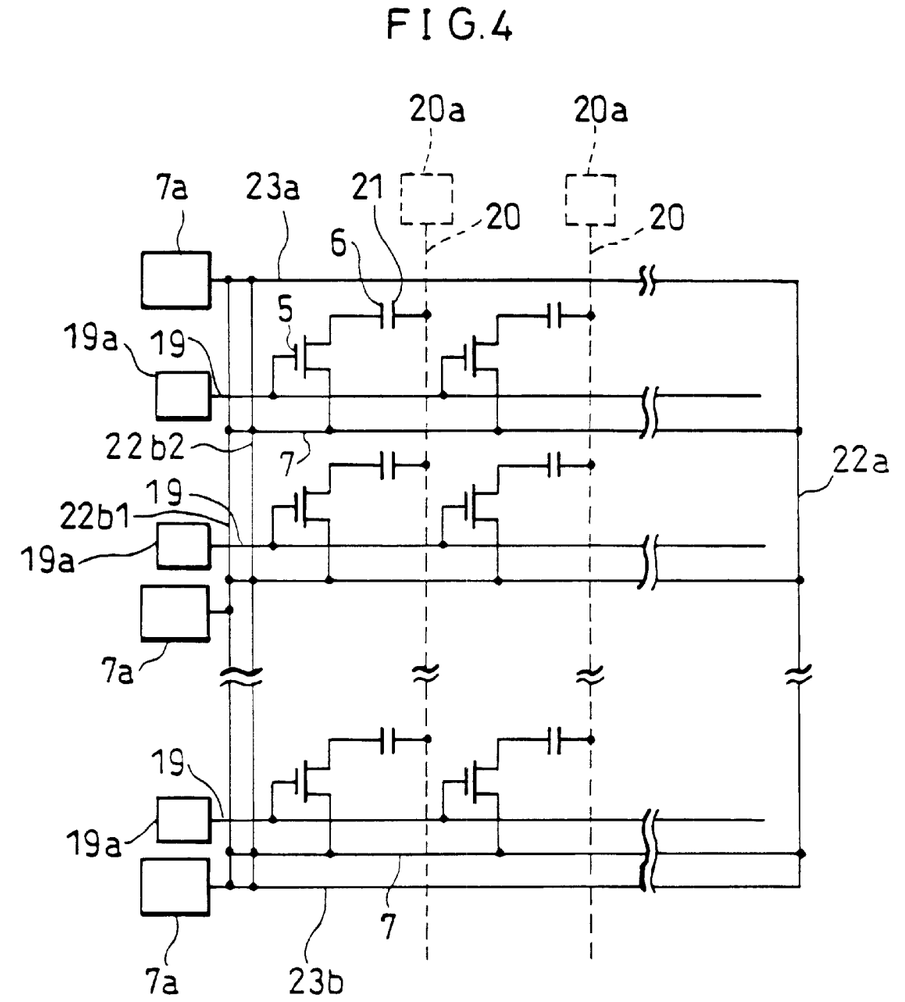
FIG. 4 is a circuit diagram showing a schematic structure of a circuit of a pixel substrate in a liquid crystal display device according to still another embodiment of the present invention.
Figure 5:
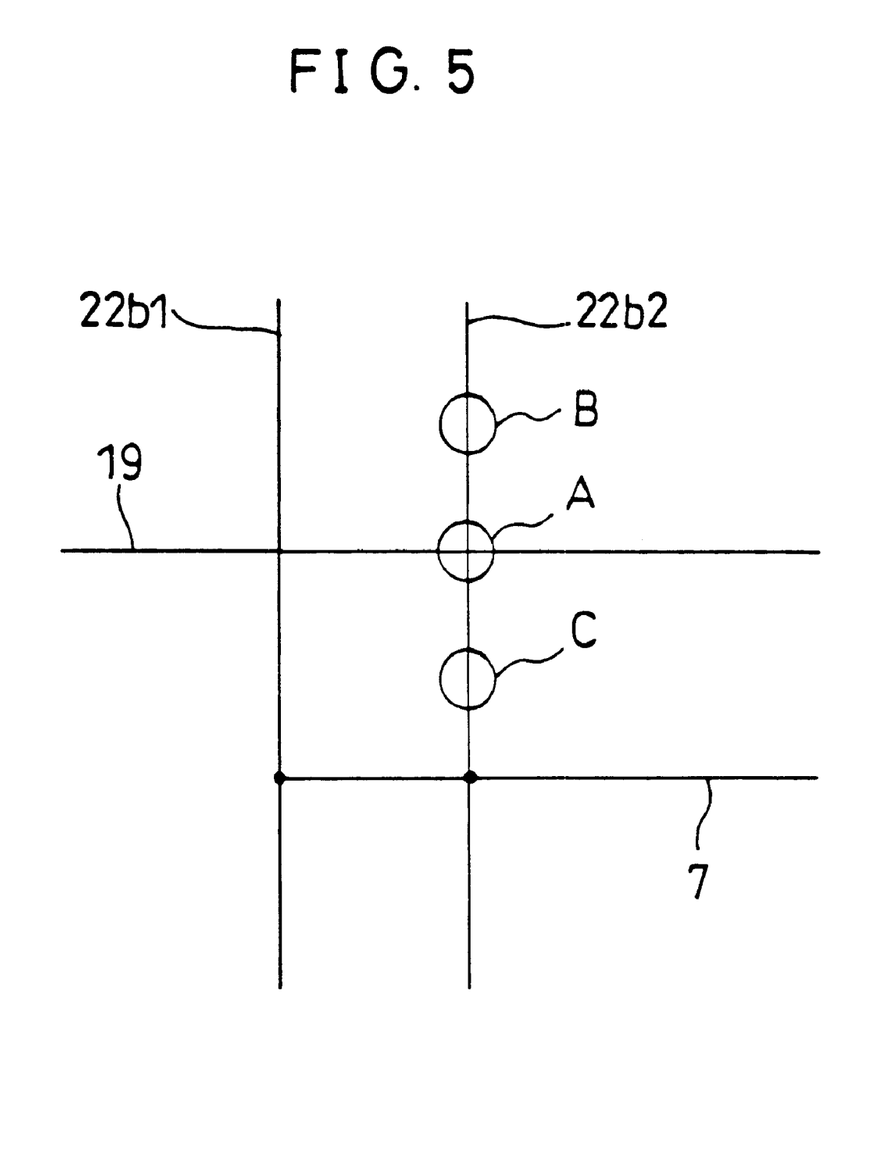
FIG. 5 is an enlarged view showing a circuit at the intersection of a second connecting line and a scanning line.
Figure 6:
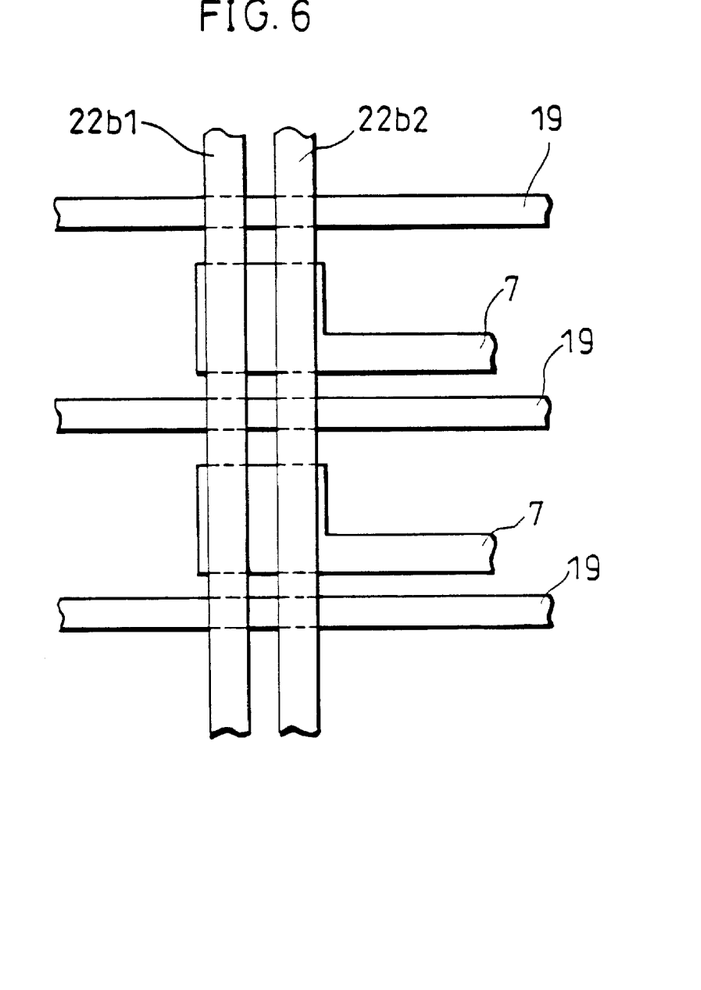
FIG. 6 is an enlarged view showing the state of wiring at the intersections of the second connecting line and scanning lines.

The following description will explain still another embodiment of the present invention with reference to FIGS. 4 to 6. The structures having the same functions as those in the above-mentioned embodiments will be designated by the same codes and the explanation thereof will be omitted.

A liquid crystal display device according to this embodiment has the same structures as those explained in the first embodiment with reference to FIG. 2, but is different from the liquid crystal display devices of the first and second embodiments in the structure of the circuit formed on the pixel substrate 1.

FIG. 4 is a circuit diagram showing a schematic structure of the circuit on the pixel substrate 1 of this liquid crystal display device. In this embodiment, two second connecting lines 22b1 and 22b2 are arranged between the image display area where the pixel electrodes 6 are formed and the region including the line into which the scanning signal input terminals 19a and reference signal input terminals 7a are arranged. Except for this structure, the structures of the third embodiment are substantially the same as the structures of the first and second embodiments.

FIG. 5 is an enlarged circuit diagram showing the intersections of the second connecting lines 22b1, 22b2 and the scanning line 19. For instance, when a short circuit occurs at the intersection A between the second connecting line 22b2 and the scanning line 19, the short circuit can be fixed by electrically cutting the section B or section C of the second connecting line 22b2 in the vicinity of the intersection A by a laser or the like. The theory for this fixing is that, with the cutting of the section B or section C, the connection of the reference signal line 7 and the second connecting line 22b2 is eliminated, but the connection between the reference signal line 7 and other second connecting line 22b1 can be maintained.

How to fix a short circuit occurred at the intersection between the second connecting line 22b2 and the scanning line 19 was explained in the above. Similarly, when a short circuit occurs at the intersection between the other second connecting line 22b1 and the scanning line 19, the short circuit can be fixed by the same way. More specifically, even when the vicinity of the intersection of the second connecting line 22b1 is electrically cut by a laser or the like, the connection between the other second connecting line 22b2 and scanning line 19 can be maintained.

FIG. 6 is an enlarged view showing the state of wiring at the intersections of the second connecting lines 22b1, 22b2 and the scanning lines 19. Incidentally, the second connecting lines 22b1, 22b2 are formed above the scanning lines 19 and reference signal lines 7, and the space between the second connecting lines 22b1, 22b2 and the scanning lines 19 is insulated by an insulating layer.

The second connecting lines 22b1, 22b2 are formed by transparent conductive films which are made of the same material as the pixel electrodes 6 and have a single layer structure. In this case, since the second connecting lines 22b1, 22b2 are formed at the same time the pixel electrodes 6 are formed, there is no need to increase the number of the production steps, and the loss of the material can be decreased.

The reference signal lines 7 are formed by the same low resistance metallic lines as the scanning lines 19. The reference signal lines 7 are arranged to have an increased width at the points where they cross the second connecting lines 22b1 and 22b2. With this arrangement, a current flowing in the second connecting lines 22b1 and 22b2 passes through the transparent conductive films of a slightly high resistance at the intersections between the second connecting lines 22b1, 22b2 and the scanning lines 19, but passes the reference signal lines 7 of a low resistance at sections other than the intersections. It is therefore possible to limit the increase in the resistance due to the formation of the second connecting lines 22b1 and 22b2 by the transparent conductive films.

According to the above-mentioned structure, several thousand pieces of prototype liquid crystal display device with a 13.3-inch display were actually produced. In such devices, defects such as a disconnection of line and a short circuit did not occur, and excellent display quality was achieved.

In this case, the reference signal lines 7 and scanning lines 19 were formed by tantalum nitride of low resistance. Moreover, an insulating film was formed by anodic oxidation of the surfaces of the reference signal lines 7 and scanning lines 19. Furthermore, the insulating structure was reinforced by forming a silicone nitride film on the insulating film. With this arrangement, the occurrence of the above-mentioned short circuit at the intersections can further be reduced. Note that in the above-mentioned prototype, each of the scanning lines 19 and reference signal lines 7 had a width of 15 $\mu$m, each of the first connecting line 22a and leading lines 23a, 23b had a width of 3 mm, and each of the second connecting lines 22b1, 22b2 had a width of 500 $\mu$m.

As described above, in the liquid crystal display device of this embodiment, since the reference signal lines 7 are connected to each other with two second connecting lines 22b1, 22b2, even if a short circuit occurs at the intersection between the scanning line 19 and the second connecting lines 22b1 or 22b2, it is possible to fix the short circuit without deteriorating the display quality by cutting the connecting line 22b1 or 22b2 involved in the short circuit. Consequently, the liquid crystal display devices can be produced at a high yield.

Furthermore, since the liquid crystal display devices of the first to third embodiments can achieve a relatively high production yield, they can significantly improve the production with a conventional production line. However, for such a production at a high yield, a production line which omits an intermediate inspection step may be used. In such a production line omitting the inspection step, even if some defective substrates are produced, the effect of reducing the production cost by the omission of the inspection step is more significant. Thus, this line is sufficiently profitable.

As described above, a first liquid crystal display device of the present invention is characterized in including: a pixel substrate; a counter substrate disposed to face the pixel substrate with a space therebetween; a liquid crystal layer placed in the space between the pixel substrate and the counter substrate; a plurality of pixel electrodes arranged in a matrix on the pixel substrate; a counter electrode provided on the counter substrate so as to correspond to the pixel electrodes; a plurality of scanning lines and a plurality of reference signal lines arranged parallel with each other on the pixel substrate, each of which being located at a boundary region between the pixel electrodes; a signal line provided on the counter substrate so that the signal line runs in a direction perpendicular to the scanning lines and is connected to the counter electrode; a three-terminal switching element provided on the pixel substrate so that terminals of the three-terminal switching element are connected to the scanning line, reference signal line and the pixel electrode, respectively; and a connecting line for connecting the plurality of reference signal lines to each other, the connecting line being provided in each of two regions outside of two sides among peripheral sides of a region where the plurality of pixel electrodes are formed, the two sides being perpendicular to the plurality of reference signal lines.

With this structure, since the signal lines and the scanning lines are provided on the separate substrates, it is possible to solve problem, i.e., the defect of a short circuit between the signal line and scanning line. It is therefore possible to provide a liquid crystal display device with a lowered rate of occurrence of pixel defects.

Moreover, since the plurality of reference signal lines are connected to each other in the regions outside of two sides among the peripheral sides of the region where the plurality of pixel electrodes are formed, the two sides being perpendicular to the plurality of reference signal lines, the reference signal is input to each reference signal line from both ends of the reference signal line. Hence, the signal delay due to the charging of the load capacitor connected to the reference signal line can be reduced to about ¼ of a signal delay when the reference signal is input from one of the ends of each reference signal line.

Besides, when the switching element is in an ON state, the load capacitance with respect to the reference signal line is about 30 times larger than the load capacitance when the switching element is in an OFF state. However, in the above-mentioned structure, since the reference signal line connected to a switching element in the ON state is connected to adjacent switching elements which are in the OFF state and located on each side of the switching element in the ON state, it is possible to significantly reduce the signal delay due to the large load capacitance.

Furthermore, since the reference signal line is arranged such that the reference signal is input from both ends of the reference signal line, even if the resistance of the reference signal line is increased to some extent, it is possible to input correctly the reference signal to the switching element. Consequently, the reference signal line can be made narrower by a design, thereby improving the aperture ratio of the pixel.

A second liquid crystal display device of the present invention is based on the first liquid crystal display device and characterized in further including leading lines for connecting the connecting lines provided in the two regions to each other, the leading lines being located outside of the region where the plurality of pixel electrodes are formed.

With this structure, since the leading lines are formed outside of the region where the plurality of pixel electrodes are formed, the materials and widths of the leading lines do not affect the aperture ratio and display quality of the liquid crystal display device. Thus, the connecting lines provided in the two regions can be connected to each other by the leading lines which are formed by a metal of low resistance and have an increased width, thereby permitting a further decrease in the signal delay in the reference signal line. In addition, the width of the reference signal line can be reduced by a design, and thereby improving the aperture ratio of the pixel.

A third liquid crystal display device of the present invention is based on the first liquid crystal display device and characterized in further including a plurality of scanning signal input terminals for inputting external scanning signals to the plurality of scanning lines, each of the scanning signal input terminals being located outside of a region where the plurality of pixel electrodes are formed, and a plurality of reference signal input terminals for inputting external reference signals to the reference signal lines, each of the reference signal input terminals being arranged inside or in proximity of a region where the plurality of scanning signal input terminals are formed.

With this structure, since the scanning signal input terminal and reference signal input terminal are located close to each other, it is possible to produce lines for supplying signals to the scanning signal input terminal and reference signal input terminal and connecting terminals by a single step. As a result, the production time and production cost can be reduced.

A fourth liquid crystal display device of the present invention is based on the first liquid crystal display device and characterized in further including a plurality of scanning signal input terminals, disposed outside of the region where the plurality of pixel electrodes are formed, for inputting external scanning signals to the plurality of scanning lines, and in that the connecting line is provided in a region between a region where the plurality of scanning signal input terminals are formed and the region where the plurality of pixel electrodes are formed.

In the region between the region where the plurality of scanning signal input terminals are formed and the region where the plurality of pixel electrodes are formed, a line for absorbing the difference between the pitch of the scanning lines in the pixels and the pitch of the scanning signal input terminals, and a sealing material which seals the liquid crystal material and fastens the counter substrate and pixel substrate together are usually provided. According to this structure, since the connecting lines are disposed in such a region, it is possible to provide the connecting lines without increasing the size of the pixel substrate and the external size of the liquid crystal display device itself.

A fifth liquid crystal display device of the present invention is based on the fourth liquid crystal display device and characterized in that a plurality of the connecting lines are provided in the region between the region where the plurality of scanning signal input terminals are formed and the region where the plurality of pixel electrodes are formed.

With this structure, since the plurality of connecting lines are provided in the above-mentioned region, even if a short circuit occurs between a certain connecting line and a scanning line, the short circuit can be fixed by electrically cutting the short-circuited section of the connecting line. The reason for this is that even when the connecting line involved in the short circuit is cut, the reference signal can be transmitted normally through the other connecting line.

Moreover, even if a certain connecting line is disconnected, the reference signal can be transmitted normally through the other connecting line, thereby improving the ratio of non-defective products.

A sixth liquid crystal display device of the present invention is based on the fourth liquid crystal display device and characterized in that intersecting portions of the connecting line which intersects the scanning lines are formed by the same material as the pixel electrodes, and portions thereof other than the intersecting portions are formed by a material including at least a layer made from the same material as the scanning lines.

According to this structure, it is possible to form the portions of the connecting line other than the intersecting portions where the connecting line intersects the scanning lines in the process of forming the scanning lines, and to form the intersecting portions in the process of forming the pixel electrodes, thereby eliminating the necessity of providing separately a process for forming the connecting line. It is thus possible to simplify the production processes and reduce the production cost.

A first method for producing a liquid crystal display device of the present invention is a method for producing the fifth liquid crystal display device and characterized by electrically cutting the connecting line in the proximity of an intersection between the scanning line and the connecting line where a short circuit occurs.

With this method, even if a short circuit occurs between the connecting line and the scanning line, the reference signal can be transmitted correctly through the connecting line on which a short circuit does not occur. Hence, the short circuit can be fixed by electrically cutting the short-circuited portion of the connecting line. It is therefore possible to produce liquid crystal display devices at a high yield.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
   a pixel substrate;
   a counter substrate disposed to face said pixel substrate with a space therebetween;
   a liquid crystal layer placed in the space between said pixel substrate and said counter substrate;
   a plurality of pixel electrodes arranged in a matrix on said pixel substrate;
   a counter electrode formed on said counter substrate to correspond to said pixel electrodes;
   a plurality of scanning lines and a plurality of reference signal lines arranged parallel with each other on said pixel substrate, at boundary regions between said pixel electrodes;
   a signal line arranged on said counter substrate so that said signal line runs in a direction perpendicular to said scanning lines and is connected to said counter electrode;
   a three-terminal switching element provided on said pixel substrate so that terminals of said three-terminal switching element are connected to said scanning line, reference signal line and pixel electrode, respectively;
   a connecting line for connecting said plurality of reference signal lines to each other, said connecting line being provided in one of two side regions outside of a region where said plurality of pixel electrodes are formed, each of said two side regions extending a length which is perpendicular to said plurality of reference signal lines;
   a plurality of scanning signal input terminals for inputting external scanning signals to said plurality of scanning lines, each of said scanning signal input terminals being located outside of the region where said plurality of pixel electrodes are formed; and
   wherein a plurality of second connecting lines are provided in the region between the region where said plurality of scanning signal input terminals are formed and the region where said plurality of pixel electrodes are formed, whereby a short circuit at an intersection of one of the second connecting lines and one of the scanning lines can be corrected by cutting the one second connecting line.

2. A liquid crystal display device comprising:
   a pixel substrate including a plurality of pixel electrodes arranged in a matrix, a plurality of reference signal lines connected to said pixel electrodes through switching elements, and a plurality of scanning lines, each of said scanning lines having a scanning signal input terminal at one end thereof, each of said switching elements being switched according to a scanning signal input through said scanning signal input terminal;
   a counter substrate disposed to face said pixel substrate, said counter substrate including a plurality of counter electrodes arranged to face said pixel electrodes and a plurality of data signal lines which intersect said scanning lines with a liquid crystal layer therebetween;
   a first connecting line for connecting said reference signal lines to each other, said first connecting line being located outside of a region where said pixel electrodes are arranged, the first connecting line being arranged on a first side of the pixel electrodes, opposite to a second side of the pixel electrodes where the scanning signal input terminals are arranged; and
   at least one second connecting line for connecting said reference signal lines to each other, said second connecting line being located outside of the region where said pixel electrodes are arranged, opposite to the pixel electrode with respect to the scanning signal input terminals to prevent the at least one second connecting line from crossing the scanning lines on the pixel substrate, and opposite to the first connecting line with respect to the pixel electrodes.

3. The liquid crystal display device as set forth in claim 2, further comprising two leading lines for connecting said first and second connecting lines, said leading lines being provided outside of the region where said pixel electrodes are arranged.

4. A liquid crystal display device comprising:
   a pixel substrate including a plurality of pixel electrodes arranged in a matrix, a plurality of reference signal lines connected to said pixel electrodes through switching elements, and a plurality of scanning lines, each of said scanning lines having a scanning signal input terminal at one end thereof, each of said switching elements being switched according to a scanning signal input through said scanning signal input terminal;

a counter substrate disposed to face said pixel substrate, said counter substrate including a plurality of counter electrodes arranged to face said pixel electrodes and a plurality of data signal lines which intersect said scanning lines with a liquid crystal layer therebetween;

a first connecting line for connecting said reference signal lines to each other, said first connecting line being located outside of a region where said pixel electrodes are arranged, the first connecting line being arranged on a first side of the pixel electrodes opposite to a second side of the pixel electrodes where the scanning signal input terminals are arranged; and a plurality of second connecting lines for connecting said reference signal lines to each other, said second connecting line being located outside of the region where said pixel electrodes are arranged and opposite to the first connecting line with respect to the pixel electrodes; and wherein the plurality of said second connecting lines are provided in a region between a region where said plurality of scanning signal input terminals are formed and the region where said plurality of pixel electrodes are formed, whereby a short circuit at an intersection of one of the second connecting lines and one of the scanning lines can be corrected by cutting the one second connecting line.

5. A liquid crystal display device comprising:

a pixel substrate;

a counter substrate disposed to face said pixel substrate with a space therebetween;

a liquid crystal layer placed in the space between said pixel substrate and said counter substrate;

a plurality of pixel electrodes arranged in a matrix on said pixel substrate;

a counter electrode formed on said counter substrate to correspond to said pixel electrodes;

a plurality of scanning lines and a plurality of reference signal lines arranged parallel with each other on said pixel substrate, at boundary regions between said pixel electrodes;

a signal line arranged on said counter substrate so that said signal line runs in a direction perpendicular to said scanning lines and is connected to said counter electrode;

a three-terminal switching element provided on said pixel substrate so that terminals of said three-terminal switching element are connected to said scanning line, reference signal line and pixel electrode, respectively; and a plurality of scanning signal input terminals for inputting external scanning signals to said plurality of scanning lines, each of said scanning signal input terminals being located outside of the region where said plurality of pixel electrodes are formed;

a first connecting line for connecting said plurality of reference signal lines to each other, said first connecting line being provided in one of two side regions outside of a region where said plurality of pixel electrodes are formed, each of said two side regions extending a length which is perpendicular to said plurality of reference signal lines; and a second connecting line for connecting said reference signal lines to each other, said second connecting line being provided opposite to the pixel electrode with respect to the plurality of scanning signal input terminals to prevent the second connecting line from crossing the plurality of scanning lines on the pixel substrate.

6. The liquid crystal display device as set forth in claim 5, further comprising two leading lines for connecting said connecting lines provided in said two regions, said leading lines being arranged outside of the region where said plurality of pixel electrodes are formed.

7. A liquid crystal display device comprising:

a pixel substrate;

a counter substrate disposed to face said pixel substrate with a space therebetween;

a liquid crystal layer placed in the space between said pixel substrate and said counter substrate;

a plurality of pixel electrodes arranged in a matrix on said pixel substrate;

a counter electrode formed on said counter substrate to correspond to said pixel electrodes;

a plurality of scanning lines and a plurality of reference signal lines arranged parallel with each other on said pixel substrate, at boundary regions between said pixel electrodes;

a signal line arranged on said counter substrate so that said signal line runs in a direction perpendicular to said scanning lines and is connected to said counter electrode;

a three-terminal switching element provided on said pixel substrate so that terminals of said three-terminal switching element are connected to said scanning line, reference signal line and pixel electrode, respectively; and first and second connecting lines for connecting said plurality of reference signal lines to each other, said first and second connecting lines being provided in first and second side regions, respectively, outside of a region wherein said plurality of pixel electrodes are formed, each of said two side regions extending a length which is perpendicular to said plurality of reference signal lines.

8. The liquid crystal display device as set forth in claim 7, further comprising two leading lines for connecting said first and second connecting lines provided in said first and second side regions, said leading lines being arranged outside of the region where said plurality of pixel electrodes are formed.

9. The liquid crystal display device as set forth in claim 7, further comprising a plurality of scanning signal input terminals for inputting external scanning signals to said plurality of scanning lines, each of said scanning signal input terminals being located outside of the region where said plurality of pixel electrodes are formed, the second connecting line being provided opposite to the pixel electrode with respect to the scanning signal input terminals so that the second connecting line does not cross the plurality of scanning lines on the pixel substrate.

10. The liquid crystal display device as set forth in claim 7, further comprising a plurality of reference signal input terminals for inputting external reference signals to the reference signal lines, each of said reference signal input terminals being located outside of the region where said plurality of pixel electrodes are formed, said second connecting line being provided in a region between a region where said plurality of reference signal input terminals are formed and the region where said plurality of pixel electrodes are formed.

* * * * *